(12) United States Patent
Zhao et al.

(10) Patent No.: US 10,906,843 B2
(45) Date of Patent: Feb. 2, 2021

(54) EXTRUSION GRANULATED UREA-FORMALDEHYDE-BASED MULTI-NUTRIENT SLOW/CONTROLLED RELEASE FERTILIZER AND PREPARATION METHOD THEREOF

(71) Applicant: North University of China, Shanxi (CN)

(72) Inventors: Guizhe Zhao, Taiyuan (CN); Yang Xiang, Taiyuan (CN); Yaqing Liu, Taiyuan (CN)

(73) Assignee: North University of China, Taiyuan (CN)

( * ) Notice: Subject to any disclaimer, the term of this patent is extended or adjusted under 35 U.S.C. 154(b) by 204 days.

(21) Appl. No.: 16/180,889

(22) Filed: Nov. 5, 2018

(65) Prior Publication Data
US 2019/0218152 A1 Jul. 18, 2019

(30) Foreign Application Priority Data
Jan. 17, 2018 (CN) .......................... 2018 1 0042319

(51) Int. Cl.
*C05B 7/00* (2006.01)
*C05B 13/00* (2006.01)
(Continued)

(52) U.S. Cl.
CPC ................ *C05B 7/00* (2013.01); *A01C 21/00* (2013.01); *C05B 13/00* (2013.01); *C05B 19/00* (2013.01);
(Continued)

(58) Field of Classification Search
CPC ........... C05B 7/00; C05B 13/00; C05B 19/00; C05G 5/12; C05C 9/02; A01C 21/00; A01G 22/20; A01G 22/22; A01G 22/00
See application file for complete search history.

(56) References Cited

U.S. PATENT DOCUMENTS

2016/0194255 A1* 7/2016 Thompson ............... C05G 3/60
504/145
2019/0218152 A1* 7/2019 Zhao ....................... C05B 19/00

* cited by examiner

*Primary Examiner* — Jennifer A Smith
(74) *Attorney, Agent, or Firm* — Christensen O'Connor Johnson Kindness PLLC

(57) ABSTRACT

The invention relates to the field of slow/controlled release fertilizer, in particular to a urea-formaldehyde-based multi-nutrient slow/controlled release fertilizer and a preparation method thereof. The urea-formaldehyde-based multi-nutrient slow/controlled release fertilizer comprises ammonium polyphosphate, inorganic silica gel and urea-formaldehyde, wherein the phosphorus-oxygen double bond of ammonium polyphosphate can at least form hydrogen bond linkage with a urea-formaldehyde molecule chain, the hydroxyl group of the inorganic silica gel can at least form hydrogen bond linkage with the urea-formaldehyde molecular chain, and ammonium polyphosphate, inorganic silica gel and urea-formaldehyde together form a hydrogen bond associated polymer network structure. The invention can prepare a urea-formaldehyde-based multi-nutrient slow/controlled release fertilizer comprising a strong hydrogen bond network structure by using a conventional aqueous solution polymerization in combination with a normal temperature extrusion granulation process, avoiding the coating process in the latter stage of the preparation of a coated fertilizer, achieving a simple and effective preparation process, and saving a lot of manpower and material resources. The urea-formaldehyde-based multi-nutrient slow/controlled release fertilizer provided by the invention can stably and continuously release nitrogen nutrient throughout the release period, thereby making up for the shortcoming of excessively long nutrient release period of the existing urea-formaldehyde fertilizers.

5 Claims, 5 Drawing Sheets

(51) Int. Cl.
  *C05C 9/02* (2006.01)
  *C05B 19/00* (2006.01)
  *A01C 21/00* (2006.01)
  *C05G 5/12* (2020.01)
  *A01G 22/20* (2018.01)
  *A01G 22/22* (2018.01)
  *A01G 22/00* (2018.01)
(52) U.S. Cl.
  CPC ................... *C05C 9/02* (2013.01); *C05G 5/12* (2020.02); *A01G 22/00* (2018.02); *A01G 22/20* (2018.02); *A01G 22/22* (2018.02)

EXTRUSION GRANULATED UREA-FORMALDEHYDE-BASED MULTI-NUTRIENT SLOW/CONTROLLED RELEASE FERTILIZER AND PREPARATION METHOD THEREOF

TECHNICAL FIELD

The present invention relates to the field of slow/controlled release fertilizer, in particular to an extrusion granulated urea-formaldehyde-based multi-nutrient slow/controlled release fertilizer and a preparation method thereof.

BACKGROUND ART

Currently, slow/controlled release fertilizers are mainly physically-coated fertilizers, the structures of which are mostly a shell-core structure, with a composite fertilizer as core and an insoluble material as shell. There exists disadvantages of complex coating process and high cost of film materials, etc., limiting the promotion and application of coated fertilizers. Especially with the increasing environmental awareness, people gradually realize that these coating materials are difficult to degrade and remain in the soil, which will cause environmental pollution.

Chemical slow/controlled release fertilizers represented by urea-formaldehyde fertilizers can effectively solve various problems of coated fertilizers, but the singleness of nutrients and excessively long slow release period limit the application range of urea-formaldehyde fertilizers. At present, urea-formaldehyde fertilizers can only be applied to perennial plants such as those on forest soils, lawns and so on, and it is difficult to apply it to short-period crops planted on a large scale such as rice, maize, wheat and vegetables.

DESCRIPTION OF THE INVENTION

In view of the above problems, the present invention provides an extrusion granulated urea-formaldehyde-based multi-nutrient slow/controlled release fertilizer and a preparation method thereof. The extrusion granulated urea-formaldehyde-based multi-nutrient slow/controlled release fertilizer is composed of a polymer network, in which urea-formaldehyde, ammonium polyphosphate and inorganic silica gel form a strong hydrogen bond association.

The invention is achieved by the following technical solutions: a urea-formaldehyde-based multi-nutrient slow/controlled release fertilizer, comprising ammonium polyphosphate, inorganic silica gel and urea-formaldehyde, wherein the phosphorus-oxygen double bond of ammonium polyphosphate can at least form hydrogen bond linkage with a urea-formaldehyde molecule chain, the hydroxyl group of the inorganic silica gel can form hydrogen bond linkage with the urea-formaldehyde molecular chain, and ammonium polyphosphate, inorganic silica gel and urea-formaldehyde together form a hydrogen bond associated polymer network structure.

As a further improvement of the technical solution of the urea-formaldehyde-based multi-nutrient slow/controlled release fertilizer of the present invention, urea and dipotassium hydrogen phosphate are also included.

As a further improvement of the technical solution of the urea-formaldehyde-based multi-nutrient slow/controlled release fertilizer, the content of nitrogen element is from 15 wt % to 38 wt %, and the content of phosphorus element as $P_2O_5$ is from greater than 0 wt % to 16 wt %, and the content of potassium element as $K_2O$ is from greater than 0 wt % to 10 wt %.

The present invention further provides a method for preparing an extrusion granulated urea-formaldehyde-based multi-nutrient slow/controlled release fertilizer, comprising the steps of:

(1) adding a calculated amount of formaldehyde and a calculated amount of urea respectively into a reactor, adjusting the pH of the system, and reacting the same at a set temperature; and then adding a calculated amount of ammonium dihydrogen phosphate and a calculated amount of potassium silicate into the reactor in sequence, and continuing to react until the system becomes viscous; and (2) after curing the obtained viscous product at room temperature, extruding it to form a strip, and then placing the strip at a high temperature of 100° C. to 180° C. for reaction and then pelletizing so as to obtain a short-section cylindrical urea-formaldehyde-based multi-nutrient slow/controlled release fertilizer.

As a further improvement of the technical solution of the preparation method of the present invention, in the urea-formaldehyde-based multi-nutrientslow/controlled release fertilizer, the content of nitrogen element is from 15 wt % to 38 wt %, and the content of phosphorus element as $P_2O_5$ is from greater than 0 wt % to 16 wt %, and the content of potassium element as $K_2O$ is from greater than 0 wt % to 10 wt %.

As a further improvement of the technical solution of the preparation method of the present invention, the molar ratio of formaldehyde to urea is 1:1-1:2.

As a further improvement of the technical solution of the preparation method of the present invention, the pH of the system is 8-12.

As a further improvement of the technical solution of the preparation method of the present invention, the set reaction temperature is 20° C.-60° C., and the reaction time is 0.5-3 h; and the reaction time at the high temperature is 0.3-3 h.

The present invention further provides the use of a urea-formaldehyde-based multi-nutrient slow/controlled release fertilizer and a short-section cylindrical urea-formaldehyde-based multi-nutrient slow/controlled release fertilizer prepared by a method for preparing an extrusion granulated urea-formaldehyde-based multi-nutrient slow/controlled release fertilizer in short-period crops.

As a further improvement of the technical solution of the use of the present invention, the short-period crops include rice, maize, wheat, vegetables and the like.

Compared with the existing fertilizers, the fertilizer of the present invention has the following advantages:

(1) The urea-formaldehyde-based multi-nutrient slow/controlled release fertilizer comprising a strong hydrogen bond network structure can be prepared by a conventional aqueous solution polymerization, avoiding the coating process in the latter stage of the preparation of coated fertilizers, achieving a simple and effective preparation process, and saving a lot of manpower and material resources.

(2) The cylindrical urea-formaldehyde-based multi-nutrient slow/controlled release fertilizer having a good particle shape can be obtained by extrusion molding at room temperature, and the granulation process is low energy consuming, simple and environmental protective, and is suitable for industrial promotion.

(3) The urea-formaldehyde-based multi-nutrient slow/controlled release fertilizer provided by the invention can stably and continuously release nitrogen nutrient throughout the release period, thereby making up for the shortcoming of excessively long nutrient release period of the existing urea-formaldehyde fertilizers. The urea-formaldehyde-based multi-nutrient slow/controlled release fertilizer can be widely applied to short-period crops planted on a large scale such as rice, maize, wheat and vegetables, and has a wide application field and broad prospects for large-scale production.

(4) The urea-formaldehyde-based multi-nutrient slow-release fertilizer provided by the invention contains a large amount of nutrients such as nitrogen, phosphorus, and potassium, and beneficial element silicon required for the growth and development of crops, making up for the shortcoming of the singleness of nutrients of the existing urea-formaldehyde fertilizers. It is not necessary to be combined with other nutrients, and the urea-formaldehyde-based multi-nutrient slow/controlled release fertilizer can be used alone to promote both the yield increase and income increase of crops.

(5) After being applied to the soil, the urea-formaldehyde-based multi-nutrient slow/controlled release fertilizer provided by the present invention is gradually hydrolyzed and degraded into small-molecular nutrients by water and soil microorganisms, reducing the fixation of the nutrients by the soil, and the degradation products are free of harmful substances and are environmentally friendly.

BRIEF DESCRIPTION OF THE DRAWINGS

In order to illustrate the embodiments of the present invention or the technical solutions in the prior art more clearly, the drawings used in the embodiments or the description of the prior art will be briefly described below. Obviously, the drawings in the following description are only some examples of the present invention, and for those skilled in the art, other drawings can be obtained in accordance with these drawings without any creative work.

Figure 4:
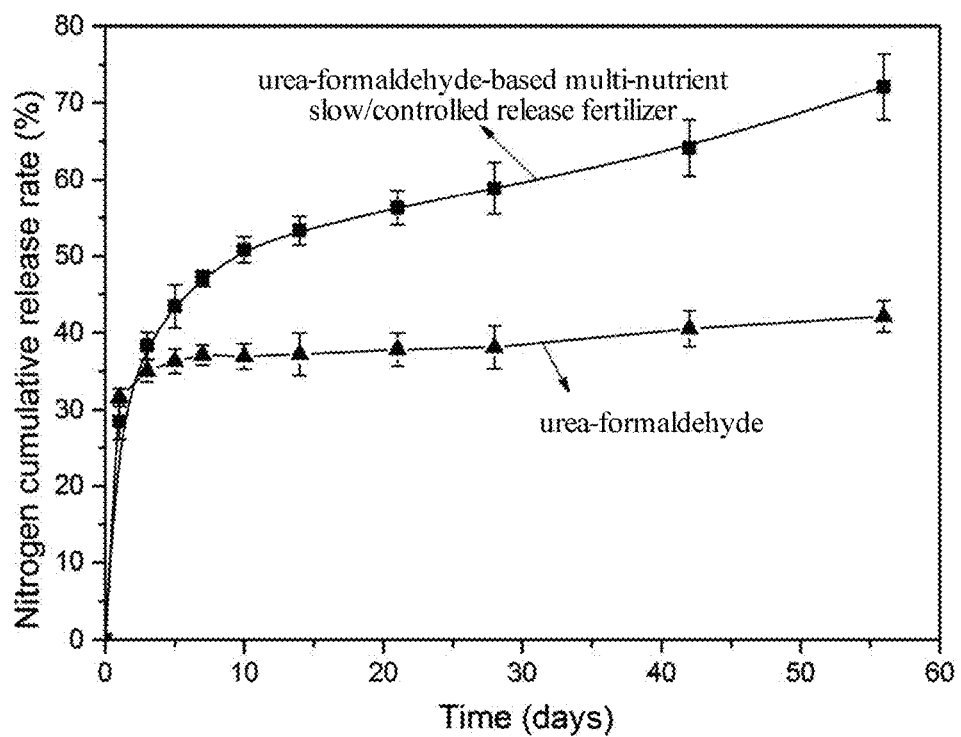
FIG. 4 is a graph showing the release curve of nutrient nitrogen of the extrusion granulated urea-formaldehyde-based multi-nutrient slow/controlled release fertilizer prepared in Example 3.
Figure 5:
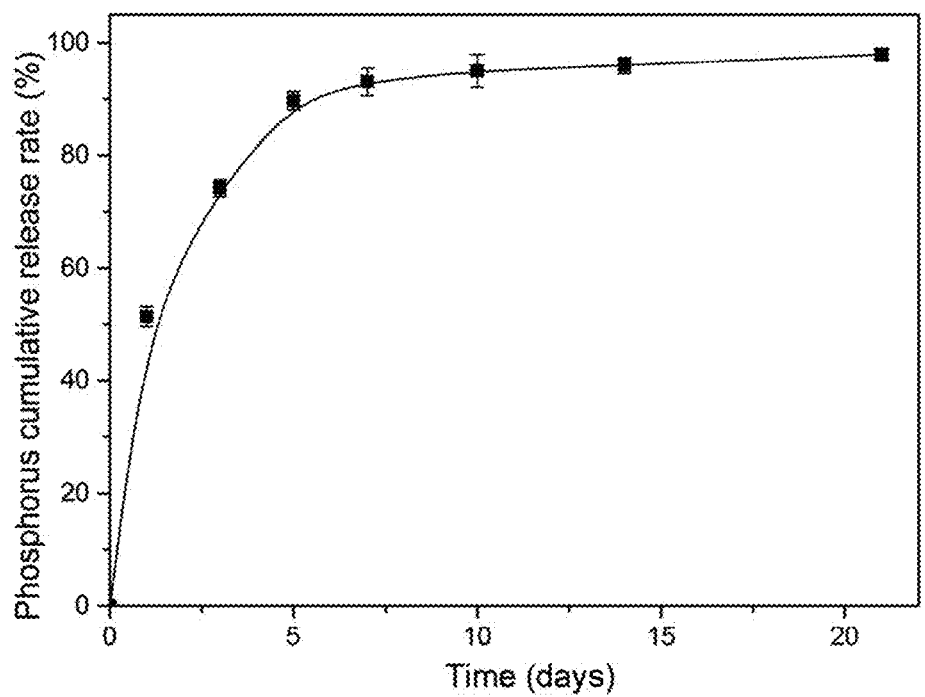
FIG. 5 is a graph showing the release curve of nutrient phosphorus of the extrusion granulated urea-formaldehyde-based multi-nutrient slow/controlled release fertilizer prepared in Example 3.
Figure 6:
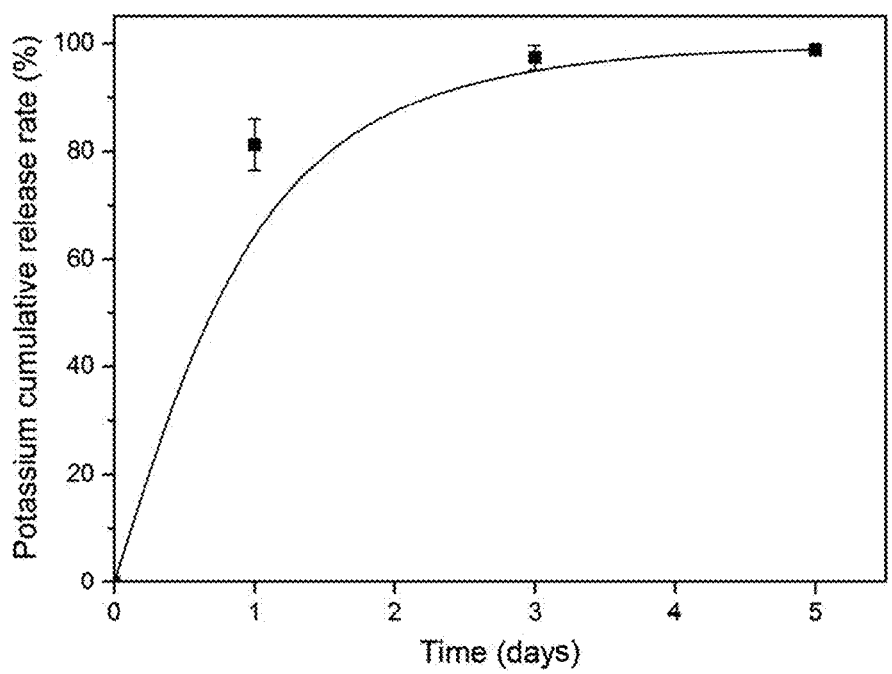
FIG. 6 is a graph showing the release curve of nutrient potassium of the extrusion granulated urea-formaldehyde-based multi-nutrient slow/controlled release fertilizer prepared in Example 3.

It can be seen from FIG. 4 to FIG. 6 that the release rate of potassium is higher than that of phosphorus and nitrogen, and the nutrient potassium has been substantially completely released on Day 5. The release equilibrium of the nutrient phosphorus can be reached on Day 10. The nutrient nitrogen release period can be divided into two stages, in which the stage of the first 10 days are a rapid release stage, and the release rate reaches 50.8% on Day 10. The nutrient nitrogen is then released substantially at a steady rate and the release rate reaches 72.12% on Day 56. By comparison, it can be found that the nitrogen release of the urea-formaldehyde fertilizer alone has reached equilibrium after Day 10, that is, it is difficult to provide the plants with the nutrient nitrogen after Day 10. It can be seen that the extrusion granulated urea-formaldehyde-based multi-nutrient slow/controlled release fertilizer has a good function of slow/controlled release of the nutrients nitrogen, phosphorus and potassium, especially controlled release of the nutrient nitrogen.

Figure 7:
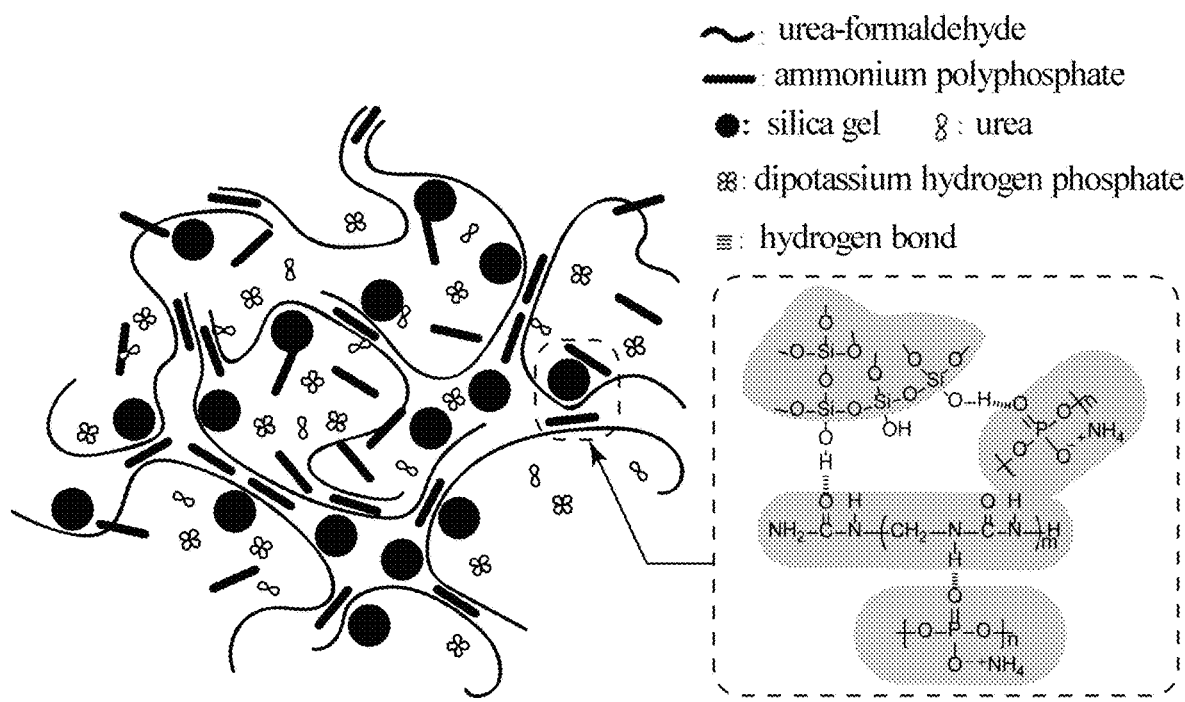

FIG. 7 is a schematic view showing the structure of the urea-formaldehyde-based multi-nutrient slow/controlled release fertilizer. The partial enlarged view shows one mode of hydrogen bond linkage between the urea-formaldehyde molecular chain with ammonium polyphosphate and inorganic silica gel. Of course, the urea-formaldehyde molecular chain of the present invention does not only have this hydrogen bond linkage mode in the urea-formaldehyde-based multi-nutrient slow/controlled release fertilizer.

Figure 8:
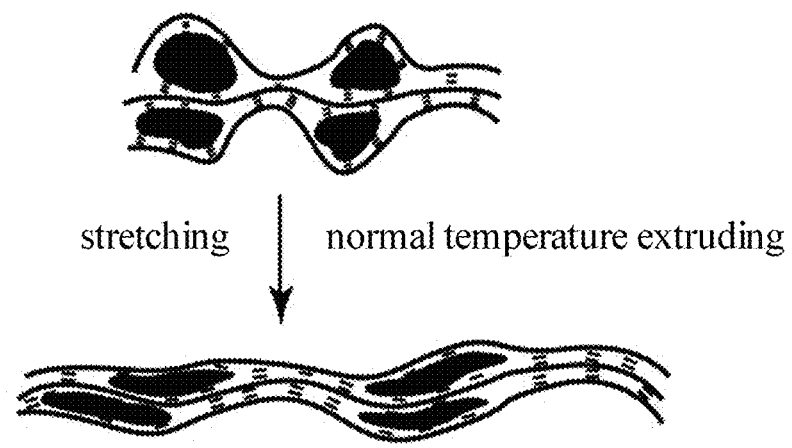

FIG. 8 shows the structural change of the urea-formaldehyde molecules during the extrusion molding for the preparation of an extrusion granulated urea-formaldehyde-based multi-nutrient slow/controlled release fertilizer. It can be seen that, during the extrusion process, the urea-formaldehyde molecular chain gradually extends and relaxes under the action of aqueous solution and mechanical shearing force, and more hydrogen bonds can be formed between the urea-formaldehyde molecular chains as well as between the urea-formaldehyde molecule and the aqueous solution. The structural change is beneficial to ensure that the granulated fertilizer particles have better mechanical properties.

BEST MODE FOR CARRYING OUT THE INVENTION

In order to make the objects, technical solutions and advantages of the present invention more clear, the technical solutions of the present invention will be described in detail below. Obviously, the described examples are only some but not all examples of the invention. All the other embodiments obtained by those skilled in the art based on the examples of the present invention without creative work fall within the protection scope of the present invention.

A urea-formaldehyde-based multi-nutrient slow/controlled release fertilizer, comprising ammonium polyphosphate, inorganic silica gel and urea-formaldehyde, wherein the phosphorus-oxygen double bond of ammonium polyphosphate can at least form hydrogen bond linkage with the urea-formaldehyde molecule chain, the hydroxyl group of the inorganic silica gel can at least form hydrogen bond linkage with the urea-formaldehyde molecular chain, and ammonium polyphosphate, inorganic silica gel and urea-formaldehyde together form a hydrogen bond associated polymer network structure.

Figure 1:
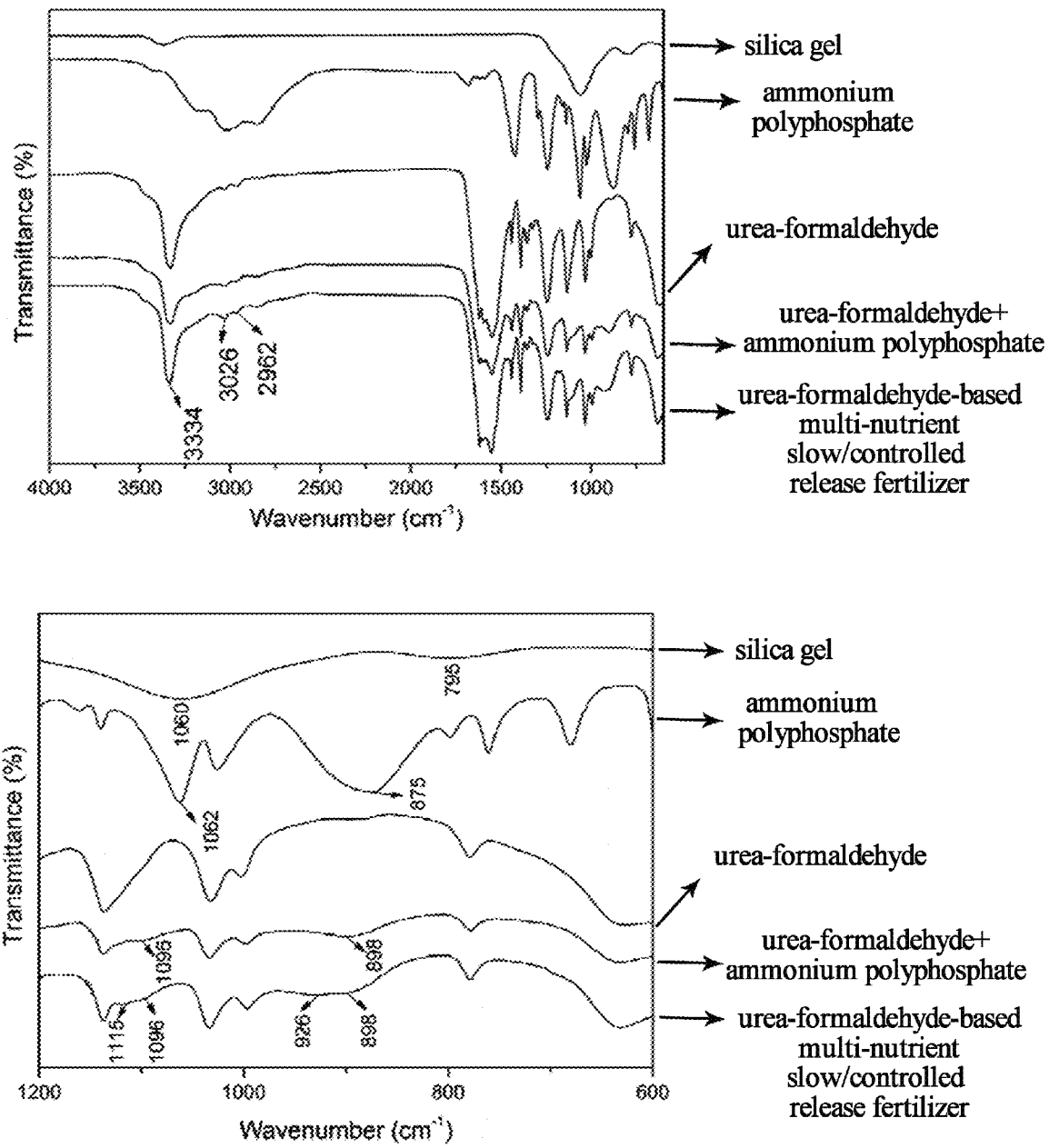
FIG. 1 is an infrared spectrum of the extrusion granulated urea-formaldehyde-based multi-nutrient slow/controlled release fertilizer prepared in Example 3. In the figure, the secondary amide stretching vibration absorption peak of the urea-formaldehyde molecule in the extrusion granulated urea-formaldehyde-based multi-nutrient slow/controlled release fertilizer is at 3334 $cm^{-1}$, and the stretching vibration absorption peaks of methylene of the urea-formaldehyde molecule are at 3026 $cm^{-1}$ and 2962 $cm^{-1}$. The P—O bond stretching vibration absorption peaks of ammonium polyphosphate appear at 1062 $cm^{-1}$ and 875 $cm^{-1}$, respectively, and compared with the infrared absorption peaks of ammonium polyphosphate, the P—O bond stretching vibration absorption peaks in the urea-formaldehyde-based multi-nutrient slow/controlled release fertilizer blue shift to 1096 $cm^{-1}$ and 898 $cm^{-1}$ respectively, indicating that there is indeed a strong hydrogen bond between the urea-formaldehyde molecular chain and ammonium polyphosphate in the extrusion granulated urea-formaldehyde-based multi-nutrient slow/controlled release fertilizer. The absorption peaks at 1060 $cm^{-1}$ and 795 $cm^{-1}$ are the stretching vibration absorption peaks of the Si—O bond of inorganic silica gel, and compared with inorganic silica gel, the Si—O bond stretching vibration absorption peaks in the extrusion granulated urea-formaldehyde-based multi-nutrient slow/controlled release fertilizer blue shift to 1115 $cm^{-1}$ and 926 $cm^{-1}$ respectively, indicating that there is indeed a strong hydrogen bond between the urea-formaldehyde molecular chain and inorganic silica gel in the extrusion granulated urea-formaldehyde-based multi-nutrient slow/controlled release fertilizer. The above analysis indicates that there is a strong hydrogen bond network among the urea-formaldehyde molecular chain, ammonium polyphosphate and inorganic silica gel in the extrusion granulated urea-formaldehyde-based multi-nutrient slow/controlled release fertilizer. The infrared spectrum indicates that the product has the said structure.
Figure 2:
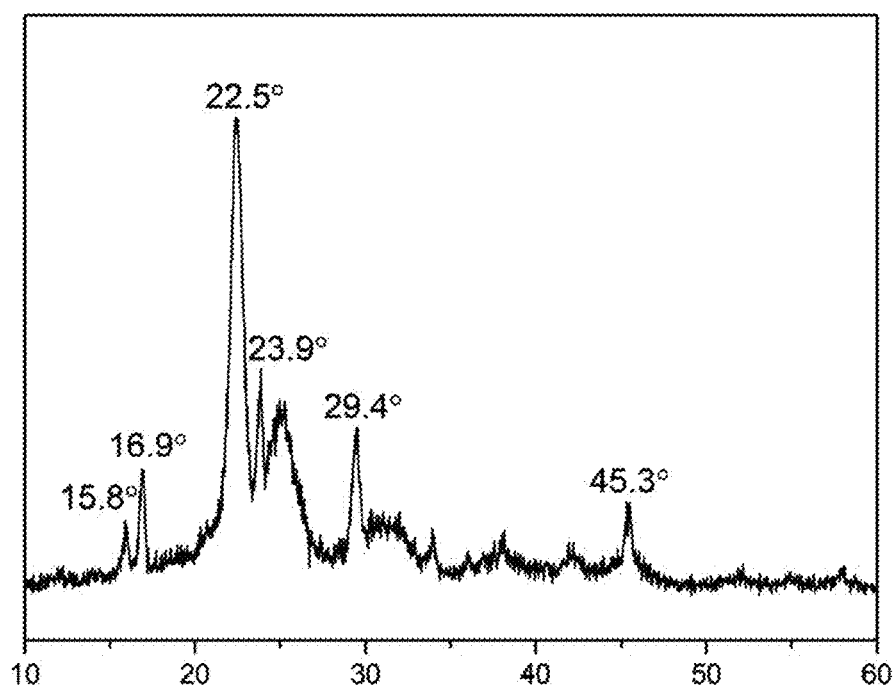
FIG. 2 is an XRD pattern of the extrusion granulated urea-formaldehyde-based multi-nutrient slow/controlled release fertilizer prepared in Example 3. The characteristic peaks of 15.8°, 16.9° and 23.9° in the figure are the diffraction peaks of ammonium polyphosphate, the characteristic peak of 22.5° is the diffraction peak of urea-formaldehyde, and the characteristic peaks of 29.4° and 45.3° are the diffraction peaks of urea. The XRD pattern indicates that the product has the said structure.
Figure 3:
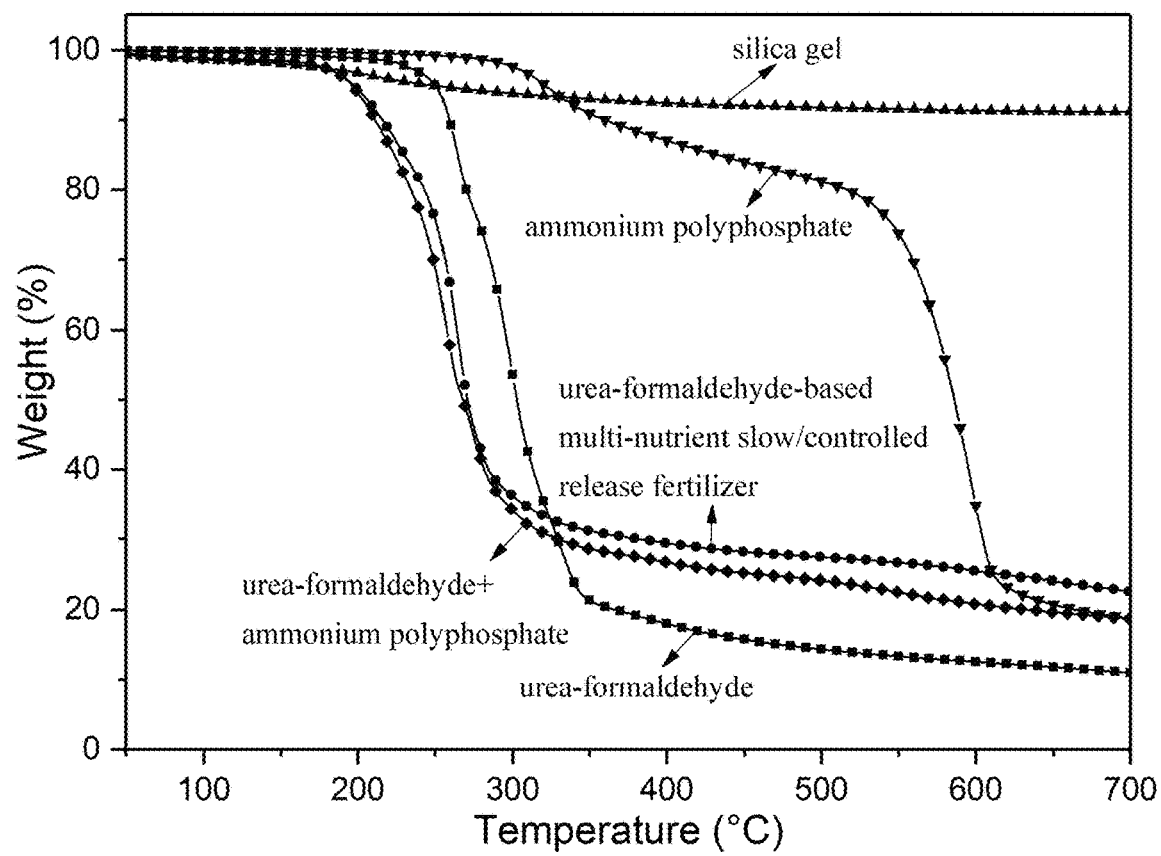
FIG. 3 is the thermogravimetric diagram of the extrusion granulated urea-formaldehyde-based multi-nutrient slow/controlled release fertilizer prepared in Example 3. It can be seen from the figure that the thermal stability decreases after the addition of ammonium polyphosphate into urea-formaldehyde, which is due to that a strong hydrogen bond formed between ammonium polyphosphate and urea-formaldehyde destroys the hydrogen bond between the urea-formaldehyde molecules and causes the arrangement of urea-formaldehyde molecules to be more disordered, thus reducing its thermal stability. The thermal stability of the extrusion granulated urea-formaldehyde-based multi-nutrient slow/controlled release fertilizer is slightly higher than that of urea-formaldehyde containing ammonium polyphosphate. This is because, compared to urea-formaldehyde fertilizer containing ammonium polyphosphate, the extrusion granulated urea-formaldehyde-based multi-nutrient slow/controlled release fertilizer contains a certain amount of inorganic silica gel, which has extremely high heat-stability on the one hand, and can form a hydrogen bond with urea-formaldehyde on the other hand. Such hydrogen bond network strongly restricts the mobility of the urea-formaldehyde molecular chain, thereby inhibiting the thermal decomposition of the urea-formaldehyde molecular chain. The above analysis indicates that the product has the said structure.

From the infrared spectrum of the urea-formaldehyde-based multi-nutrient slow/controlled release fertilizer provided in FIG. 1, it can be seen that: there is indeed a strong hydrogen bond action between the urea-formaldehyde molecular chain and ammonium polyphosphate in the urea-formaldehyde-based multi-nutrient slow/controlled release fertilizer, and there is indeed a strong hydrogen bond action between the urea-formaldehyde molecular chain and inorganic silica gel. However, it is not excluded that there also exists a hydrogen bond linkage structure between the inorganic silicone gel and ammonium polyphosphate. It can be seen from FIG. 8 and common knowledge in the art that more hydrogen bonds can be formed between the urea-formaldehyde molecular chains as well as between the urea-formaldehyde molecules and an aqueous solution.

In some specific embodiments of the present invention (as shown in FIG. 7), urea and dipotassium hydrogen phosphate are also included. Specifically, since ammonium polyphosphate, inorganic silica gel and urea-formaldehyde together can form a hydrogen bond associated polymer network structure, the polymer network structure contains groups capable of interacting with nitrogen and hydrogen atoms, and urea, dipotassium hydrogen phosphate, etc. can be encapsulated and adsorbed through the hydrogen bond, van der Waals force and the like, forming a spatial crossing network structure. Therefore, it is not excluded either that urea, dipotassium hydrogen phosphate or the like can combine with any one or more polymers of ammonium polyphosphate, inorganic silica gel, and urea-formaldehyde via an action force therebetween such as hydrogen bond formation and the like.

Since different crops have different requirements for various elements in the multi-nutrient slow/controlled release fertilizer, those skilled in the art can control the amount of each element in the urea-formaldehyde-based multi-nutrient slow/controlled release fertilizer according to actual requirements. Preferably, in the urea-formaldehyde-based multi-nutrient slow/controlled release fertilizer provided by the present invention, the content of nitrogen element is from 15 wt % to 38 wt %, and the content of phosphorus element as $P_2O_5$ is from greater than 0 wt % to 16 wt %, and the content of potassium element as $K_2O$ is from greater than 0 wt % to 10 wt %.

The urea-formaldehyde-based multi-nutrient slow/controlled release fertilizer of the invention has a strong hydrogen bond network structure, and can stably and continuously release nitrogen nutrient throughout the release period, thereby making up for the shortcoming of excessively long nutrient release period of the existing urea-formaldehyde fertilizers. The invention has no special requirement for the preparation method of the urea-formaldehyde-based multi-nutrient slow/controlled release fertilizer, as long as the urea-formaldehyde-based multi-nutrient slow/controlled release fertilizer having the above-mentioned structure can be prepared. According to a preferred embodiment of the present invention, the present invention further provides a method for preparing an extrusion granulated urea-formaldehyde-based multi-nutrient slow/controlled release fertilizer, comprising the steps of:

(1) adding a calculated amount of formaldehyde and a calculated amount of urea respectively into a reactor, adjusting the pH of the system, and reacting the same at a set temperature; and then adding a calculated amount of ammonium dihydrogen phosphate and a calculated amount of potassium silicate into the reactor in sequence, and continuing to react until the system becomes viscous; and (2) after curing the obtained viscous product at room temperature, extruding it to form a strip, and then placing the strip at a high temperature of 100° C. to 180° C. for reaction and then pelletizing so as to obtain a short-section cylindrical urea-formaldehyde-based multi-nutrient slow/controlled release fertilizer.

At present, the granulation process of urea-formaldehyde fertilizer is still extensive crushing granulation. This granulation process has the disadvantages of excessive dust, environmental pollution and extremely irregular particle shape. However, the preparation method of an extrusion granulated urea-formaldehyde-based multi-nutrient slow/controlled release fertilizer provided by the invention solves many problems existing in the existing granulation process of the urea-formaldehyde fertilizer. More importantly, during the extrusion process, the urea-formaldehyde molecular chain gradually extends and relaxes under the action of aqueous solution and mechanical shearing force, and more hydrogen bonds can be formed between the urea-formaldehyde molecular chains as well as between the urea-formaldehyde molecule and the aqueous solution. The structural change is beneficial to ensure that the granulated fertilizer particles have better mechanical properties.

The reaction mechanism of the above-mentioned preparation method is as follows:

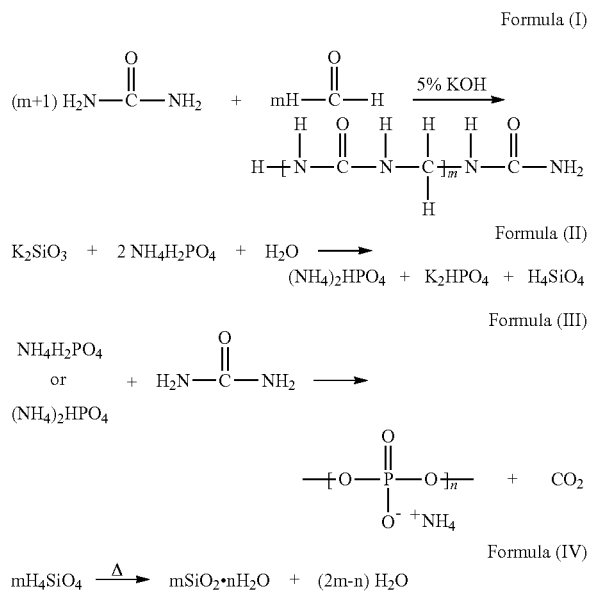

In the preparation method of the present invention, the reaction of the Formula (I) and the Formula (II) occurs in the step (1), and the reaction of the Formula (III) and the Formula (IV) occurs in the step (2). In the urea-formaldehyde-based multi-nutrient slow/controlled release fertilizer prepared by the preparation method of the invention, the phosphorus-oxygen double bond of ammonium polyphosphate can at least form hydrogen bond linkage with the urea-formaldehyde molecule chain, the hydroxyl group of the inorganic silica gel can at least form hydrogen bond linkage with the urea-formaldehyde molecular chain, and ammonium polyphosphate, inorganic silica gel and urea-formaldehyde together form a hydrogen bond associated polymer network structure. However, it is not excluded that the raw materials therein do not completely react, and can combine with any one or more polymers of ammonium polyphosphate, inorganic silica gel, and urea-formaldehyde via an action force therebetween such as hydrogen bond formation and the like. It is not excluded either that the by-product in the reaction can combine with any one or more polymers of ammonium polyphosphate, inorganic silica gel, and urea-formaldehyde via an action force therebetween such as hydrogen bond and the like.

In the preparation method of the present invention, those skilled in the art can also prepare various urea-formaldehyde-based multi-nutrient slow/controlled release fertilizer having different nitrogen, phosphorus and potassium contents by controlling the addition amounts of the reaction raw materials urea, formaldehyde, ammonium dihydrogen phosphate and potassium silicate according to different requirements. Therefore, the calculated amount described in the present invention is for preparing a urea-formaldehyde-based multi-nutrient slow/controlled release fertilizer having desired contents according to requirements. The curing time is not specifically defined in the step (2), because when the water content of the viscous product is different, the curing time is also different. The length of the curing time is such that the viscous product can be extruded into a strip, which is easily accomplished by those skilled in the art. In the present invention, the preferred curing time is 0-24 h.

Preferably, in the urea-formaldehyde-based multi-nutrient slow/controlled release fertilizer, the content of nitrogen element is from 15 wt % to 38 wt %, the content of phosphorus element as $P_2O_5$ is from greater than 0 wt % to 16 wt %, and the content of potassium element as $K_2O$ is from greater than 0 wt % to 10 wt %. The present invention further provides a more preferred embodiment, wherein the molar ratio of formaldehyde to urea is 1:1-1:2.

In accordance with the method of the present invention, an apparatus that is capable of extruding the product into a strip can be selected within a wide range of apparatus, and any apparatus capable of achieving the extruding of a strip can achieve the object of the present invention. Preferably, the extruding step is carried out by an extruder. The strip extruded through the extruder has a circular cross section, which can then be formed into a short-section cylindrical urea-formaldehyde-based multi-nutrient slow/controlled release fertilizer by a pelletizing process.

In the present invention, preferably, the pH of the system is 8-12. The set reaction temperature is 20° C.-60° C., and the reaction time is 0.5-3 h; and the reaction time at the high temperature is 0.3-3 h.

The present invention further provides the use of a urea-formaldehyde-based multi-nutrient slow/controlled release fertilizer of the present invention or a short-section cylindrical urea-formaldehyde-based multi-nutrient slow/controlled release fertilizer prepared by the preparation method of an extrusion granulated urea-formaldehyde-based multi-nutrient slow/controlled release fertilizer of the present invention in short-period crops.

For the extrusion granulated urea-formaldehyde-based multi-nutrient slow/controlled release fertilizer of the present invention, the nutrient potassium has been substantially completely released on Day 5. The release equilibrium of the nutrient phosphorus can be reached on Day 10. The nutrient nitrogen release period can be divided into two stages, in which the stage of the first 10 days are a rapid release stage, and the release rate reaches 50.8% on Day 10. The nutrient nitrogen is then released substantially at a steady rate and the release rate reaches 72.12% on Day 56. The urea-formaldehyde-based multi-nutrient slow/controlled release fertilizer has a good function of slow/controlled release of the nutrients nitrogen, phosphorus and potassium, especially controlled release of the nutrient nitrogen, and is especially suitable for short-period crops, presumably due to its special hydrogen bond network structure.

In the present invention, the short-period crops refer to crops of two or more croppings a year. Preferably, the short-period crops include rice, maize, wheat, vegetables, and the like.

The technical solution of the present invention will be described in detail below with reference to the accompanying drawings.

EXAMPLE 1

A preparation method of an extrusion granulated urea-formaldehyde-based multi-nutrient slow/controlled release fertilizer, comprising the steps of:

(1) adding formaldehyde and urea at a molar ratio of 1:1 respectively into a reactor, adjusting the pH of the system to pH=8, and reacting the same at 20° C. for 2 h to obtain a methylol urea solution; and then adding 9 g of ammonium dihydrogen phosphate and 7 g of potassium silicate in sequence into the reactor, and continuing to react until the system becomes viscous; and (2) after curing the obtained viscous product at room temperature for 24 h, extruding it into a strip by an extruder, then placing the strip at 120° C. to react for 1 h, and then pelletizing to obtain a cylindrical urea-formaldehyde-based multi-nutrient slow/controlled release fertilizer.

The obtained extrusion granulated urea-formaldehyde-based multi-nutrient slow/controlled release fertilizer has a nitrogen content of 21.84%, a phosphorus content of 12.85% as $P_2O_5$, and a potassium content of 3.61% as $K_2O$.

EXAMPLE 2

A preparation method of an extrusion granulated urea-formaldehyde-based multi-nutrient slow/controlled release fertilizer, comprising the steps of:

(1) adding formaldehyde and urea at a molar ratio of 1:1.2 respectively into a reactor, adjusting the pH of the system to pH=9, and reacting the same at 50° C. for 2 h to obtain a methylol urea solution; and then adding 9 g of ammonium dihydrogen phosphate and 28 g of potassium silicate in sequence into the reactor, and continuing to react until the system becomes viscous; and (2) after curing the obtained viscous product at room temperature for 0.5 h, extruding it into a strip by an extruder, then placing the strip at 160° C. to react for 0.5 h, and then pelletizing to obtain a short-section cylindrical urea-formaldehyde-based multi-nutrient slow/controlled release fertilizer.

The obtained extrusion granulated urea-formaldehyde-based multi-nutrient slow/controlled release fertilizer has a nitrogen content of 15.32%, a phosphorus content of 15.69% as $P_2O_5$, and a potassium content of 9.58% as $K_2O$.

EXAMPLE 3

A preparation method of an extrusion granulated urea-formaldehyde-based multi-nutrient slow/controlled release fertilizer, comprising the steps of:

(1) adding formaldehyde and urea at a molar ratio of 1:1.5 respectively into a reactor, adjusting the pH of the system to pH=9, and reacting the same at 50° C. for 2 h to obtain a methylol urea solution; and then adding 9 g of ammonium dihydrogen phosphate and 7 g of potassium silicate in sequence into the reactor, and continuing to react until the system becomes viscous; and (2) after curing the obtained viscous product at room temperature for 0.5 h, extruding it into a strip by an extruder, then placing the strip at 160° C. to react for 0.5 h, and then pelletizing to obtain a short-section cylindrical urea-formaldehyde-based multi-nutrient slow/controlled release fertilizer.

The obtained extrusion granulated urea-formaldehyde-based multi-nutrient slow/controlled release fertilizer has a nitrogen content of 34.76%, a phosphorus content of 11.01% as $P_2O_5$, and a potassium content of 2.12% as $K_2O$.

COMPARATIVE EXAMPLE 1

A non-extrusion molding preparation method of a urea-formaldehyde-based multi-nutrient slow/controlled release fertilizer, comprising the steps of:

(1) adding formaldehyde and urea at a molar ratio of 1:1.5 respectively into a reactor, adjusting the pH of the system to pH=9, and reacting the same at 50° C. for 2 h to obtain a methylol urea solution; and then adding 9 g of ammonium dihydrogen phosphate and 7 g of potassium silicate in sequence into the reactor, and continuing to react until the system becomes viscous; and (2) after curing the obtained viscous product at room temperature for 0.5 h, placing it at 160° C. to react for 0.5 h, and then pelletizing to obtain an irregular urea-formaldehyde-based multi-nutrient slow/controlled release fertilizer.

TABLE 1

Comparison of the mechanical properties of the urea-formaldehyde-based multi-nutrient slow/controlled release fertilizers in Example 3 and Comparative Example 1

| Item | Compressive Strength (MPa) |
| --- | --- |
| Example 3 | 0.26 |
| Comparative Example 1 | 0.15 |

It can be seen from the table that the compressive strength of urea-formaldehyde-based multi-nutrient slow/controlled release fertilizer of Example 3 is much larger than that of Comparative Example 1. This indicates that extrusion molding can indeed significantly improve the compressive strength of the urea-formaldehyde-based multi-nutrient slow/controlled release fertilizer. This is mainly due to the fact that the molecular chain gradually changes from a random coil into an extended chain after extrusion molding, leading to the increase of the hydrogen bonds between the molecular chains and the increase of the strength thereof.

EXAMPLE 4

A preparation method of an extrusion granulated urea-formaldehyde-based multi-nutrient slow/controlled release fertilizer, comprising the steps of:

(1) adding formaldehyde and urea at a molar ratio of 1:1.5 respectively into a reactor, adjusting the pH of the system to pH=12, and reacting the same at 50° C. for 3 h to obtain a methylol urea solution; and then adding 9 g of ammonium dihydrogen phosphate and 9 g of potassium silicate in sequence into the reactor, and continuing to react until the system becomes viscous; and (2) after curing the obtained viscous product at room temperature for 1 h, extruding it into a strip by an extruder, then placing the strip at 100° C. to react for 3 h, and then pelletizing to obtain a short-section cylindrical urea-formaldehyde-based multi-nutrient slow/controlled release fertilizer.

The obtained extrusion granulated urea-formaldehyde-based multi-nutrient slow/controlled release fertilizer has a nitrogen content of 33.39%, a phosphorus content of 10.42% as $P_2O_5$, and a potassium content of 2.57% as $K_2O$.

EXAMPLE 5

A preparation method of an extrusion granulated urea-formaldehyde-based multi-nutrient slow/controlled release fertilizer, comprising the steps of:

(1) adding formaldehyde and urea at a molar ratio of 1:2 respectively into a reactor, adjusting the pH of the system to pH=9, and reacting the same at 60° C. for 0.5 h to obtain a methylol urea solution; and then adding 9 g of ammonium dihydrogen phosphate and 5 g of potassium silicate in sequence into the reactor, and continuing to react until the system becomes viscous; and (2) after curing the obtained viscous product at room temperature for 0.5 h, extruding it into a strip by an extruder, then placing the strip at 180° C. to react for 0.3 h, and then pelletizing to obtain a short-section cylindrical urea-formaldehyde-based multi-nutrient slow/controlled release fertilizer.

The obtained extrusion granulated urea-formaldehyde-based multi-nutrient slow/controlled release fertilizer has a nitrogen content of 38.41%, a phosphorus content of 9.34% as $P_2O_5$, and a potassium content of 1.07% as $K_2O$.

The above description is only the specific embodiments of the present invention, but the protection scope of the present invention is not limited thereto, and any person skilled in the art can easily conceive changes or substitutions within the technical scope disclosed by the present invention, and all of the changes and substitutions should be encompassed in the protection scope of the present invention. Therefore, the protection scope of the invention should be determined by the protection scope of the appended claims.

The invention claimed is:

1. A method for preparing an extrusion granulated urea-formaldehyde-based multi-nutrient slow release fertilizer, comprising the steps of:
   (1) adding a calculated amount of formaldehyde and a calculated amount of urea respectively into a reactor to obtain a reaction system, and then adjusting the pH of the reaction system, and reacting the same at a set temperature; and then adding a calculated amount of ammonium dihydrogen phosphate and a calculated amount of potassium silicate into the reactor in sequence, and continuing to react until the reaction system becomes viscous; and
   (2) curing the obtained viscous product from the reaction system in step (1) at room temperature, and then extruding it by an extruder to form a strip, and then placing the strip at a high temperature of 100° C. to 180° C. for reaction and then granulating said extruded strip to short-section cylindrical granules so as to obtain an extrusion granulated cylindrical urea-formaldehyde-based multi-nutrient slow release fertilizer,
   wherein the prepared extrusion granulated urea-formaldehyde-based multi-nutrient slow release fertilizer comprises ammonium polyphosphate, inorganic silica gel, urea-formaldehyde, urea and dipotassium hydrogen phosphate, wherein the phosphorus-oxygen double bond of ammonium polyphosphate forms at least a hydrogen bond linkage with the urea-formaldehyde molecular chain, the hydroxyl group of the inorganic silica gel forms at least a hydrogen bond linkage with the urea-formaldehyde molecular chain, and the ammonium polyphosphate, inorganic silica gel and urea-formaldehyde together form a hydrogen bond associated polymer network structure.

2. The method for preparing an extrusion granulated urea-formaldehyde-based multi-nutrient slow release fertilizer according to claim 1, wherein in the urea-formaldehyde-based multi-nutrient slow release fertilizer, the content of nitrogen element is from 15 wt % to 38 wt %, and the content of phosphorus element as $P_2O_5$ is from greater than 0 wt % to 16 wt %, and the content of potassium element as $K_2O$ is from greater than 0 wt % to 10 wt %.

3. The method for preparing an extrusion granulated urea-formaldehyde-based multi-nutrient slow release fertilizer according to claim 2, wherein the molar ratio of formaldehyde to urea added in the calculated amounts in step (1) is 1:1-1:2.

4. The method for preparing an extrusion granulated urea-formaldehyde-based multi-nutrient slow release fertilizer according to claim 3, wherein the pH of the reaction system in step (1) is 8-12.

5. The method for preparing an extrusion granulated urea-formaldehyde-based multi-nutrient slow release fertilizer according to claim 4, wherein the set reaction temperature is 20° C.-60° C., and the reaction time is 0.5-3 h; and the reaction time at the high temperature is 0.3-3 h.

* * * * *